United States Patent [19]

Kupfer et al.

[11] Patent Number: 5,114,616

[45] Date of Patent: May 19, 1992

[54] ESTERIFIED GLYCIDYL ETHER ADDITION PRODUCTS AND THEIR USE

[75] Inventors: Rainer Kupfer, Kastl; Martin Hille, Liederbach; Roland Böhm, Kelkheim/Taunus; Friedrich Staiss, Wiesbaden, all of Fed. Rep. of Germany

[73] Assignee: Hoechst Aktiengesellschaft, Frankfurt am Main, Fed. Rep. of Germany

[21] Appl. No.: 569,999

[22] Filed: Aug. 20, 1990

[30] Foreign Application Priority Data

Aug. 22, 1989 [DE] Fed. Rep. of Germany ....... 3927638

[51] Int. Cl.⁵ ............... B01D 17/04; C07C 69/80; C07C 69/75; C07C 69/353
[52] U.S. Cl. .................. 252/337; 252/342; 252/358; 560/85; 560/86; 560/127; 560/194
[58] Field of Search .................. 560/85, 86, 194, 127; 252/337, 342, 358

[56] References Cited

U.S. PATENT DOCUMENTS

| | | | |
|---|---|---|---|
| 4,419,265 | 12/1983 | Diery et al. | 252/331 |
| 4,420,413 | 12/1983 | Diery et al. | 252/331 |
| 4,730,079 | 3/1988 | Hofinger et al. | 560/196 |
| 4,734,523 | 3/1988 | Hofinger et al. | 560/196 |

FOREIGN PATENT DOCUMENTS 1153356 9/1983 Canada .

*Primary Examiner*—Michael L. Shippen
*Assistant Examiner*—Vera C. Clarke

[57] ABSTRACT

The novel glycidyl ether addition products are obtained by esterification of a diol compound, selected from the group comprising linear oxyalkylates and other amine-free aliphatic diols, and an addition compound of polyether block polymers and glycidyl ethers with dicarboxylic acids. They are advantageously employed for demulsifying crude oil emulsions.

5 Claims, No Drawings

ESTERIFIED GLYCIDYL ETHER ADDITION PRODUCTS AND THEIR USE

DESCRIPTION

The invention relates to amine-free esterified glycidyl ether addition products and the use of these products In crude oil production, increasing dilution of the oil with water occurs. The entrained water forms a water-in-oil emulsion with the oil. Salts, such as sodium chloride, calcium chloride and magnesium chloride, may be dissolved in the emulsified water. This emulsion water must be removed before transportation The salt content is lowered further in the refineries by renewed formation of an emulsion with fresh water and demulsification before the distillation. Too high a salt content in crude oil can lead to trouble and corrosion in refineries. A crude oil demulsifier, also called an emulsion breaker, has the task of breaking the emulsion at the lowest possible use concentration and of effecting complete deposition of the water in this separation process, if possible without or with minimal additional use of heat, and of the reducing the salt content to a minimum. The quality criteria for delivered crude oil are the residual salt and the water content. Crude oils vary in composition according to their origin. The naturally occurring emulsion stabilizers have a complicated, different chemical build-up. Selective demulsifiers must be developed to overcome their action. The requirements imposed on a crude oil demulsifier are even more diverse because of the various production and processing conditions. Because new oil fields are constantly being opened up and the production conditions of older oil fields are changing, the development of optimum demulsifiers remains an acute problem and a large number of demulsifiers or demulsifier mixtures of varying build-up is required.

Glycidyl ether addition products are known from Canadian Patent 1,153,356 as thickeners for hydraulic fluids based on glycol-water. Specifically, these are, inter alia, addition products of ethylene oxide/propylene oxide block polymers and diglycidyl ethers of bisphenols or polyglycidyl ethers of phenol/formaldehyde condensation products (Novolak resins). Addition products of ethylene oxide/propylene oxide block polymers and glycidyl ethers as crude oil demulsifiers are described in the two U.S. Pat. Nos. 4,419,265 and 4,420,413. The crude oil demulsifiers of U.S. Pat. No. 4,419,265 are obtained by adding an ethylene oxide/propylene oxide block polymer on to a diglycidyl ether of bisphenols, and those of U.S. Pat. No. 4,420,413 are obtained by following the addition step mentioned also by oxyalkylation with ethylene oxide, propylene oxide and/or butylene oxide.

Esterification products of oxyalkylated primary fatty amines, ethylene oxide/propylene oxide block polymers and dicarboxylic acids are described as crude oil demulsifiers in U.S. Pat. No. 4,734,523, and further crude oil demulsifiers are obtained according to U.S. Pat. No. 4,730,079 by quaternization of the esterification products mentioned.

Finally, the esterified glycidyl ether addition products according to German Offenlegungsschrift 3,809,065-Al may also be mentioned. They are obtained by esterification of an oxyalkylated primary fatty amine and an addition product of polyether block polymers and glycidyl ethers with a dicarboxylic acid and are said to be crude oil demulsifiers wit a high demulsifying action It has been found that all the crude oil demulsifiers mentioned still leave something to be desired.

The present invention provides novel crude oil demulsifiers which are esterification products of a diol compound, selected from the group comprising linear oxyalkylates and other certain aliphatic diols (1), an addition compound of ethylene oxide/propylene oxide block polymers and glycidyl ethers (2) and a dicarboxylic acid (3). The novel esterified glycidyl ether addition products differ from those proposed in the above German Offenlegungsschrift 3,809,065-Al and the most closely related in that component (1) is not a diol in the form of an oxyalkylated primary fatty amine but is an amine-free (nitrogen-free) diol compound. It is surprising that other crude oil demulsifiers of high efficiency are obtained by this replacement. The reason for this probably lies in the specific structure of the reaction products which results from the combination according to the invention of the above components (1) to (3).

The addition products according to the invention accordingly are obtained by esterification of (1) a diol compound of the following formula Ia

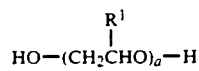

HO—(CH$_2$CHO)$_a$—H in which a is a number from 1 to 60 and R$^1$ is H or CH$_3$ and can also assume both meanings within the chain of the polyoxyalkylene radical, located in blocks or randomly, or of the following formula Ib

HO—R$^2$—OH in which R$^2$ is an acyclic (straight-chain or branched, saturated or unsaturated) divalent hydrocarbon radical, and (2) an addition product of 1 mol of OH function of a polyether block copolymer of the following formula II

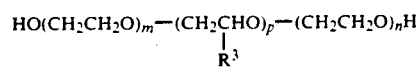

HO(CH$_2$CH$_2$O)$_m$—(CH$_2$CHO)$_p$—(CH$_2$CH$_2$O)$_n$H
|
R$^3$ in which R$^3$ is methyl or ethyl, n and m are numbers which are chosen so that the polyethylene oxide content is 10 to 80% of the molecular weight of the total molecule and p is a number from 10 to 100, and 0.3 to 1 mol of epoxide function of a glycidyl ether of the following formula III

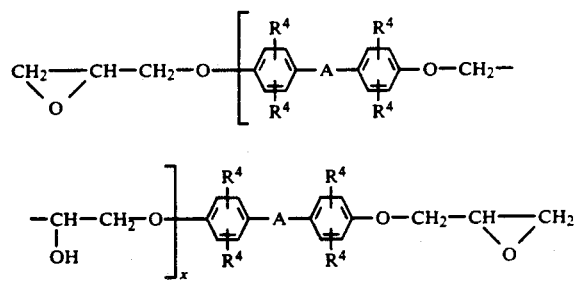

in which R$^4$ can be identical or different and is hydrogen, C$_1$ to C$_4$-alkyl or halogen, A is a direct bond, a sulfonyl or cyclohexyl group or a group of the formula

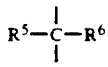

$R^5$ and $R^6$ are hydrogen, methyl or phenhyl and x is a number from 0 to 10, or 0.1 to 1.5 mol of epoxide function of a glycidyl ether of the following formula IV

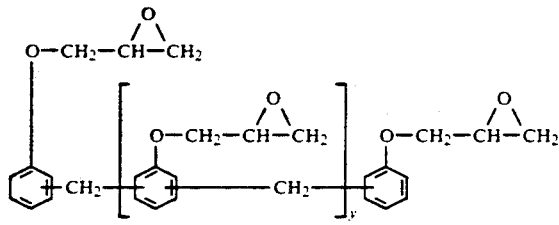

in which y is a number from 1 to 10, with (3) a dicarboxylic acid, the reaction components (1), (2) and (3) being employed in an equivalent ratio of 1:(0.1 to 1.5):(0.5 to 2).

Preferred diol compounds of the formula Ia are those where a = 2 to 40 (it goes without saying that a can be integers or fractions). The following may be added to the meanings of $R^1$ in formula Ia: $R^1$ is H, the polyoxyalkylene radicals being polyoxyethylene, or $R^1$ is $CH_3$, the polyoxyalkylene radicals being polyoxypropylene, or $R^1$ is both H and $CH_3$, the polyoxyalkylene radicals being polyoxyethylene and polyoxypropylene in blocks or in random form. Examples of diols of the formula Ia are diethylene glycol ($R^1$ = H, a = 2), polyethylene glycol of molecular weight 400 ($R^1$ = H, a = about 8 as the mean value), polypropylene glycol of molecular weight 3,000 ($R^1$ = $CH_3$, a = about 56 as the mean value) and ethylene oxide/propylene oxide block polymers having one propylene oxide block of 30 propylene oxide units and two ethylene oxide blocks of in each case 5 ethylene oxide units ($R^1$ = H and $CH_3$, a = about 40 as the mean value).

Preferred diol compounds of the formula Ib are those where $R^2$ is a (straight or branched) alkylene radical or alkenylene radical. The alkylene radical preferably contains 2 to 18 carbon atoms. Examples of such diols are ethylene glycol, propylene glycol, butanediol, hexanediol, octanediol, dodecanediol, octadecanediol and 2,2-dimethyl-propane-1,3-diol (neopentyl glycol); 2-ethyl-hexane-1,3-diol; 2,2,4-trimethylpentane-1,3-diol and 2-methyl-2-sec.-butyl-propane-1,3-diol. In the case of the alkenylene radical mentioned, which can contain one or more double bonds, higher molecular weight (polymeric) compounds are also possible in addition to low molecular weight (non-polymeric) compounds. Examples of the low molecular weight diols which may be mentioned are compounds such as 2-butene-1,4-diol, and examples of polymeric diols which may be mentioned are the polybutadienes having terminal hydroxyl groups. These polybutadiene-diols correspond to the formula $HO-(C_4H_6)_b-OH$ in which b is a number from 20 to 70, preferably 40 to 60. They are a liquid of only low viscosity and are commercially available under the name Liquiflex-H (this product is as a rule a mixture of about 60% by weight of trans-1,4-unsaturated, about 20% by weight of cis-1,4-unsaturated and about 20% by weight of vinyl-1,2-unsaturated).

Preferred polyether block polymers of the formula II are those where $R^3$ is $CH_3$, n and m are numbers which are chosen so that the polyethylene oxide content is 15 to 70% of the molecular weight of the total molecule and p is a number from 20 to 70.

Preferred glycidyl ethers of the formula III, that is to say diglycidyl ethers of bisphenols, are those where $R^4$ is in each case identical and is hydrogen, A is a group of the formula

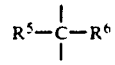

in which $R^5$ and $R^6$ are identical and are H or $CH_3$ and x is a number from 0 to 5.

Preferred glycidyl ethers of the formula IV, that is to say polyglycidyl ethers of phenol/formaldehyde condensation products, are those where y is a number from 2 to 5 (the $-CH_2-$ bridges in the formula IV are known to be essentially in the ortho- and para-position on the phenyl nucleus).

The reaction component (2) is prepared by addition of a polyether block polymer of the formula II on to a glycidyl ether of the formula III in a equivalent ratio or 1:0.3 to 1, preferably 1:0.5 to 0.9, or on to a glycidyl ether of the formula IV in an equivalent ratio of 1:0.1 to 1.5, preferably 1:0.3 to 1.

It has been found that crude oil demulsifiers having a particularly good action are obtained if reaction component (2) is propoxylated, that is to say if the above addition product of a polyether block polymer of the formula II and glycidyl ether of the formula III or of the formula IV has been propoxylated with 5 to 700 g of propylene oxide, preferably 30 to 300 g of propylene oxide, per 100 g of addition product.

The polyether block polymers of the formula II and the glycidyl ethers of the formulae III and IV as well as the reactions of these components to give the addition products in question, which are reaction components (2) of the present invention, are described in detail in the abovementioned publications such that it is unnecessary to go into them in more detail here. They are also commercially available.

The dicarboxylic acid to be employed, that is to say reaction component (3) can be aromatic or aliphatic in nature. The aromatic dicarboxylic acid is preferably phthalic acid. The aliphatic dicarboxylic acids can be saturated or unsaturated, such as fumaric acid and maleic acid. Both the customary dicarboxylic acids of the formula $HOOC-(CH_2)_z-COOH$, in which z is a number from preferably 1 to 8 and in which one or more $CH_2$ groups can be substituted by OH, $C_1$ to $C_{18}$—alkyl or $C_3$ to $C_{18}$—alkenyl, and those in the form dimerized fatty acids corresponding to the formula $HOOC-R-COOH$, in which R is the alkyl skeleton of a dimerized fatty acid having preferably 22 to 42 carbon atoms, in particular 34 carbon atoms, are possible. Preferred dimerized fatty acids are those which are commercially available under the name Pripol. As is known, these dimerized fatty acids contain essentially linear and cyclic compounds as well as portions of trimeric and more highly condensed fatty acids.

Representative of the customary dicarboxylic acids mentioned are succinic, adipic, pimelic and sebacic acid as well as dodecyl- or dodecenylsuccinic acid, malic acid and tartaric acid. The dicarboxylic acids preferred as reaction component (3) are accordingly a) those of the formula HOOC—(CH$_2$)$_z$—COOH in which z is a number from 1 to 8, b) the C$_1$ to C$_{18}$—alkyl— or C$_3$ to C$_{18}$—alkenyl—substituted dicarboxylic acids of the above formula, such as dodecyl- or dodecenylsuccinic acid, c) the dimerized fatty acids of the formula HOOC—R—COOH, in which R is the alkyl skeleton of a dimerized fatty acid having 22 to 42 carbon atoms, in particular 34 carbon atoms, d) fumaric and maleic acid and e) phthalic acid.

It goes without saying that dicarboxylic acid anhydrides, dicarboxylic acid halides or dicarboxylic acid esters can also be employed instead of a dicarboxylic acid, since the esterification reaction according to the invention also proceeds with these dicarboxylic acid derivatives.

The characteristic feature of the esterification of reaction components (1), (2) and (3) described to prepare the crude oil demulsifier according to the invention is the equivalent ratio in which the three components are employed; this is 1:(0.1 to 1.5):(0.5 to 2), preferably 1:(0.3 to 1):(0.7 to 1.5). The esterification which proceeds with polycondensation can be carried out using a higher-boiling inert solvent, such as toluene, xylene and industrial aromatic fractions, or without a solvent in the melt, and under the cover of an inert gas, the procedure in solvents being preferred. If the esterification is carried out with a solvent, the reflux temperature of the reaction mixture is advantageously chosen as the reaction temperature and the water of reaction formed is removed by azeotropic distillation. In the case of esterification in bulk, the water of reaction is discharged directly from the reaction mixture. The reaction temperature is 100° to 220° C., preferably 160° to 200° C. An alkaline or acid catalyst is used to accelerate the reaction, as is advantageous for esterification reactions, acid catalysis being preferred. The course and the end of the reaction can be monitored with the aid of the water of reaction formed or by determination of the acid number.

A preferred process for the preparation of the novel crude oil demulsifiers is described in more detail below.

The disfunctional alcohol component (1), the addition compound of polyether block polymers and glycidyl ethers (2) and the dicarboxylic acid (3) as well as the acid catalyst are initially introduced into a reaction vessel. Suitable acid catalysts are hydrogen halide acids, phosphoric acids, sulfuric acid, sulfonic acid and halogenoacetic acids. Hydrochloric acid, phosphoric acids and sulfonic acids are preferred. The amount of acid as the catalyst is in general 0.05 to 5% by weight, preferably 0.1 to 1% by weight, based on the total weight of the three reaction components initially introduced. A particularly advantageous catalyst for the esterification reaction according to the invention is a mixture of one of the acids mentioned and an alkyl titanate or alkylpolytitanate. Alkyl titanates of the formula Ti(OR')$_4$, in which R' is an alkyl radical having 1 to 18 carbon atoms, preferably 1 to 6 carbon atoms, alkyl polytitanates of the formula R'O—[Ti(OR')$_2$O]$_q$—R', in which R' has the meaning given and q is a number from 1 to 10, preferably 4 to 7, and diisopropyl-diethanolamine titanate are preferred. The amount of titanate is as rule 0.05 to 2% by weight, preferably 0.1 to 1% by weight, the percentages by weight being based on the total weight of the three reaction components. The acid is also employed in such an amount if the combination in question of acid and titanate is used as the catalyst.

The mixture of the three reaction components, the solvent and the esterification catalyst introduced into the reaction vessel is heated to 100° to 220° C., preferably 160 to 200° C., while stirring and passing through an inert gas, and is kept at this temperature, the water formed being continuously discharged (azeotropic distillation), until the reaction has ended. The resulting esterification product can be purified from the catalyst employed by washing with water. The reaction time is in the range from 5 to 20 hours The nitrogen-free esterification products according to the invention are yellow to brown-colored liquids. They have specific chemical characteristics and a specific structure, and have a viscosity of 500 to 60,000 mPa.s, preferably 1,000 to 40,000 mPa.s. Since they are preferably prepared in the presence of solvents, they are as a rule in the form of a concentrated solution (active compound content preferably 60 to 80% by weight).

The addition products according to the invention are distinguished by a high demulsifying action. At the customary temperatures for processing crude oil, complete deposition of the water and reduction of the salt content is already achieved after a short separation time. Acceptance-specific crude oils are thus obtained after a short separation time at the customary processing temperatures using the novel crude oil demulsifiers. These moreover have the effect that the water separated off is practically free from oil, so that complete oil deposition from the water separated off and therefore a good water quality is thus also achieved A sharp separation between the oil and water phase is furthermore achieved with the novel crude oil demulsifiers, which represent another great advantage. All these advantages are obtained to a particular degree in the case of paraffinic crude oils. The amount of demulsifier according to the invention employed can vary within wide limits. It depends in particular on the nature of the crude oil and on the processing temperature The effective amount is in general 5 to 100 g of per tonne, preferably 10 to 50 g per tonne. The novel demulsifiers are preferably employed in solution for the purpose of better metering and dispersibility. Suitable solvents are water or organic liquids, for example alcohols, such as methanol, isopropanol or butanol, aromatic hydrocarbons, such as toluene or xylene, and commercially available mixtures of higher aromatics.

The invention will now be illustrated in still more detail with the aid of Examples.

The addition products of a polyether block polymer of the formula II and a glycidyl ether of the formula III or IV used in the Examples are first described below; these are the addition products (2a) to (2e).

Addition product (2a) was obtained by addition of 1 mol of hydroxyl function of a polyether block polymer of the formula II, where R$^3$ = CH$_3$, m + n = 22 and p = 29 and having a polyethylene oxide content of 36.3%, based on a molecular weight of the total molecule, that is to say 2,668, and 0.8 mol of epoxide function of a glycidyl ether of the formula III, where R$^4$ = H, A = C(CH$_3$)$_2$, and x = 0.2, the equivalent weight of the total molecule being 192. The equivalent weight of the addition product is 1,275.

Addition product (2b) was obtained by addition of 1 mol of hydroxyl function of the abovementioned polyether block polymer and 0.9 mol of epoxide function of a glycidyl ether of the formula IV, where y = 3.3, the equivalent weight of the total molecule being 180. The equivalent weight of the addition product is 976.

Addition product (2c) is addition product (2a), propoxylated with 50 g of propylene oxide per 100 g of addition product. The equivalent weight is 1,870.

Addition product (2d) is addition product (2a), propoxylated with 100 g of propylene oxide per 100 g of addition product. The equivalent weight is 2,192.

Addition product (2e) is addition product (2b), propoxylated with 250 g of propylene oxide per 100 g of addition product. The equivalent weight is 1,600.

Although the addition of the polyether block polymers in question and glycidyl ether and the propoxylation of the addition product are well-known, the following may also be said on the addition: it was carried out in detail in a manner such that the polyether block polymer was first brought to a catalyst content of 0.05 to 3% by weight, preferably 0.1 to 1% by weight, with an aqueous solution of an alkaline catalyst (for example with an approximately 30% strength by weight aqueous potassium hydroxide solution), and the mixture was then reacted with the glycidyl ether at a temperature of 70° to 150° C., preferably 80° to 120° C.

EXAMPLE 1

396 g, which corresponds to 2.0 mol of hydroxyl function, of a polyethylene glycol of the formula Ia, in which $R^1$ is H and a is 8.6 (reaction component 1), 2,192 g, that is to say 1.0 mol of hydroxyl function, of addition product (2d) (reaction component 2) and 516 g, that is to say 1.8 mol of carboxyl function, of a dimerized fatty acid having an alkyl skeleton having 34 carbon atoms (reaction component 3) are introduced into a reaction vessel fitted with a stirrer, water separator, reflux condenser and thermometer. The three reaction components are thus employed in an equivalent ratio of 1:0.5:0.9. 776 g (which corresponds to 25% by weight, based on the total weight of the three reaction components) of an industrial aromatic fraction having a boiling range from 186° to 216° C. are added as the solvent A mixture of 15.5 g of dodecylbenzenesulfonic acid (that is to say 0.5% by weight, based on the total weight of the three reaction components) and 6.2 g of diisopropyl di-tri-ethanolaminotitanate (that is to say 0.2% by weight, based on the total weight of the three educts) functions as the esterification catalyst The mixture is heated up to 195° C. in the course of 2 hours, while stirring, the reaction components reacting, with esterification, and the water of reaction being distilled off azeotropically. The temperature of 195° C. is retained for a further 5 hours. The course and the end of the esterification reaction is monitored by determination of the acid number. The product obtained at a degree of conversion of 98.3% is a yellow liquid having an active compound content of 85.0% and a viscosity of 1.8 Pa.s.

EXAMPLE 2

Reaction components (1) Propylene glycol of the formula Ia, in which $R^1$ is $CH_3$ and a is 56 (equivalent weight = 1,622 g/mol of OH).

(2) Addition product (2a).
(3) Maleic anhydride.
Equivalent ratio of (1):(2):(3) = 1:1.5:2.
Procedure as in Example 1, with the difference that the solvent is employed in an amount of 67% by weight, based on the total weight of the three reaction components. Degree of conversions 94.9%, viscosity 3.6 Pa.s, active compound content 58.1%.

EXAMPLE 3

Reaction components (1) Ethylene oxide/propylene oxide block polymer of the formula Ia having a central propylene oxide block ($R^1$ = $CH_3$) of 30 propylene oxide units and in each case one ethylene oxide block ($R^1$ = H) attached thereto of in each case 5 ethylene oxide units (equivalent weight = 1,129 g/mol of OH).

(2) Addition product (2c).
(3) Phthalic anhydride.
Equivalent ratio of (1):(2):(3) = 1:0.1:0.5.
Procedure as in Example 1.
Degree of conversions 99%, viscosity 4.0 Pa.s, active compound content 77.6%.

EXAMPLE 4

Reaction components (1) Diol compound of the formula Ib, in which $R^2$ is $(C_4H_6)_{40}$, that is to say a polybutadiene-diol (equivalent weight = 1,104 g/mol of OH).

(2) As in Example 1.
(3) Succinic anhydride.
Equivalent ratio of (1):(2):(3) = 1:1:1.5.
Procedure as in Example 2.
Degree of conversions 98%, viscosity 4.2 Pa.s, active compound content 59.2%.

EXAMPLE 5

Reaction components (1) As in Example 1.
(2) As in Example 3.
(3) Dodecenylsuccinic anhydride.
Equivalent ratio of (1):(2):(3) = 1:0.3:0.9.
Procedure as in Example 1.
Degree of conversions 99%, viscosity 3.6 Pa.s, active compound content 79.5%.

EXAMPLE 6

Reaction components (1) 1,6-hexanediol: $HO(CH_2)_6OH$.
(2) As in Example 1.
(3) Adipic acid.
Equivalent ratio of (1):(2):(3) = 1:0.4:0.9.
Procedure as in Example 1.
Degree of conversions 98.4%, viscosity 1.1 Pa.s, active compound content 74%.

EXAMPLE 7

Reaction components (1) Neopentyl glycol.
(2) Addition product 2(b).
(3) Dicarboxylic acid of the formula.

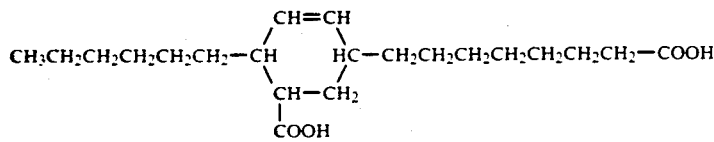

Equivalent ratio of (1):(2):(3) = 1:0.9:1.4.
Procedure as in Example 1.
Degree of conversions 99%, viscosity 8.3 Pa.s, active compound content 82%.

EXAMPLE 8

Reaction components (1) Ethylene oxide/propylene oxide block polymer of the formula Ia having a central propylene oxide block ($R^1$ = $CH_3$) of 29 propylene oxide units and in each case one ethylene oxide block ($R^1$ = H) attached thereto of in each case 4 ethylene oxide units (equivalent weight = 940 g/mol of OH).
(2) Addition product (2e).
(3) Maleic acid.
Equivalent ratio of (1):(2):(3) = 1:0.5:1.2.
Procedure as in Example 1
Degree of conversions 98%, viscosity 38 Pa.s, active compound content 84%.

The crude oil demulsifiers according to the invention of Examples 1 to 8 were tested in crude oil emulsions. The results are summarized in the following Tables I to III.

TABLE I

| Origin of the crude oil emulsion: | Kuwait |
| Water content of the crude oil emulsion: | 25.6% by volume |
| Salt content of the crude oil emulsion: | 4.32% by weight |
| Demulsification temperature: | 28° C. |
| Metered amount: | 38 ppm |

| Esterification product from Example | Water separation in % by volume after hours | | | | | Residual salt content in % by weight in the oil phase |
|---|---|---|---|---|---|---|
| | 1 | 2 | 4 | 6 | 8 | 12 | |
| 1 | 12 | 42 | 70 | 81 | 98 | 100 | 0.16 |
| 2 | 0 | 5 | 20 | 95 | 100 | 100 | 0.12 |
| 3 | 40 | 61 | 75 | 86 | 99 | 100 | 0.21 |
| 4 | 26 | 28 | 30 | 51 | 100 | 100 | 0.23 |
| 5 | 55 | 61 | 65 | 72 | 98 | 100 | 0.11 |
| 6 | 21 | 62 | 98 | 99 | 100 | 100 | 0.06 |
| 7 | 5 | 37 | 61 | 75 | 100 | 100 | 0.18 |
| 8 | 8 | 11 | 39 | 68 | 97 | 100 | 0.33 |
| Blank value | 0 | 0 | 0 | 0 | 0 | 0 | 3.11 |

TABLE II

| Origin of the crude oil emulsion: | Emsland |
| Water content of the crude oil emulsion: | 62.0% by volume |
| Salt content of the crude oil emulsion: | 9.23% by weight |
| Demulsification temperature: | 40° C. |
| Metered amount: | 27 ppm |

| Esterification product from Example | Water separation in % by volume after minutes | | | | | Residual salt content in % by weight in the oil phase |
|---|---|---|---|---|---|---|
| | 20 | 40 | 60 | 90 | 120 | 180 | |
| 1 | 5 | 73 | 93 | 98 | 100 | 100 | 0.09 |
| 2 | 58 | 82 | 96 | 99 | 100 | 100 | 0.12 |
| 3 | 36 | 39 | 42 | 95 | 99 | 100 | 0.30 |
| 4 | 16 | 23 | 63 | 72 | 98 | 100 | 0.16 |
| 5 | 12 | 51 | 72 | 89 | 99 | 100 | 0.27 |
| 6 | 45 | 62 | 81 | 93 | 97 | 100 | 0.29 |
| 7 | 11 | 18 | 25 | 85 | 100 | 100 | 0.07 |
| 8 | 55 | 68 | 73 | 80 | 99 | 100 | 0.09 |

TABLE II-continued

| Blank value | 0 | 0 | 0 | 0 | 0 | 3 | 7.82 |

TABLE III

| Origin of the crude oil emulsion: | Venezuela |
| Water content of the crude oil emulsion: | 34.5% by volume |
| Demulsification temperature: | 85° C. |
| Metered amount: | 42 ppm |

| Esterification product from Example | Water separation in % by volume after minutes | | | | | | Residual water content in % by volume in the oil phase |
|---|---|---|---|---|---|---|---|
| | 10 | 20 | 30 | 60 | 90 | 120 | |
| 1 | 35 | 58 | 81 | 97 | 100 | 100 | 0.18 |
| 2 | 55 | 56 | 59 | 82 | 90 | 100 | 0.36 |
| 3 | 82 | 88 | 93 | 98 | 99 | 100 | 0.32 |
| 4 | 68 | 69 | 71 | 74 | 98 | 100 | 0.27 |
| 5 | 32 | 58 | 63 | 86 | 97 | 100 | 0.40 |
| 6 | 66 | 82 | 87 | 92 | 100 | 100 | 0.15 |
| 7 | 48 | 51 | 55 | 84 | 88 | 100 | 0.41 |
| 8 | 28 | 42 | 57 | 75 | 99 | 100 | 0.21 |
| Blank value | 0 | 0 | 0 | 0 | 0 | 0 | 11.16 |

I claim:
1. An esterified glycidyl ether addition product prepared by esterification of the components consisting essentially of
(1) a diol compound of the following formula Ia

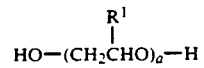

which a is a number from 2 to 40 and $R^1$ is H or $CH_3$ and can also assume both meanings within the chain of the polyoxyalkylene radical, located in blocks or randomly, or of the following formula Ib

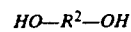

in which $R^2$ is an acyclic divalent hydrocarbon radical, and, or a propoxylated addition product
(2) an addition product of 1 mol of OH function of a polyether block copolymer of the following formula II

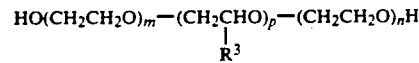

in which $R^3$ is methyl or ethyl, n and m are numbers which are chosen so that the polyethylene oxide content is 10 to 80% of the molecular weight of the total molecule and p is a number from 10 to 100, and 0.3 to 1 mol of epoxide function of a glycidyl ether of the following formula III

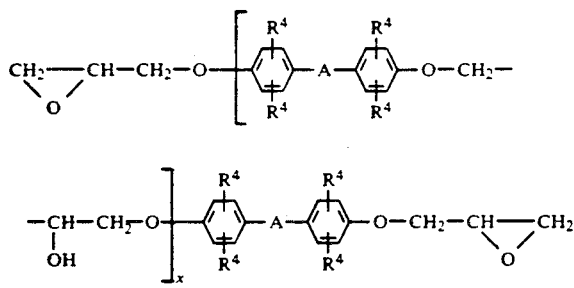

in which $R^4$ can be identical or different and is hydrogen, $C_1$ to $C_4$—alkyl or halogen, A is a direct bond, a sulfonyl or cyclohexyl group or a group of the formula

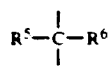

$R^5$ and $R^6$ are hydrogen, methyl or phenhyl and x is a number from 0 to 10, or 0.1 to 1.5 mol of epoxide function of a glycidyl ether of the following formula IV

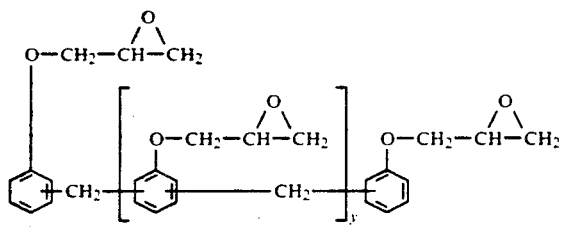

in which y is a number from 1 to 10, which (3) a dicarboxylic acid, the reaction components (1), (2) and (3) being employed in an equivalent ratio of 1:0.1 to 1.5:0.5 to 2.

2. A glycidyl ether addition product as claimed in claim 1, wherein the diol compound (1) is an oxyalkylate according to the formula Ia, in which a is a number from 2 to 40, or a polybutadiene-diol according to the formula Ib, in which $R^2$ is —$(C_4H_6)_b$—, where b is 20 to 70, and wherein the addition product (2) is formed from 1 mol of OH function of a polyether block polymer of the formula II, in which $R^3$ is $CH_3$ and m and n are numbers which are chosen so that the polyethylene oxide content is 15 to 70% of the molecular weight of the total molecule, and p is a number from 20 to 70, and 0.3 to 1 mol of epoxide function of a glycidyl ether of the formula III, in which $R^4$ is H, A is a group of the formula

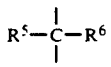

in which $R^5$ and $R^6$ are H or $CH_3$ and x is a number from 0 to 5, or 0.1 to 1.5 mol of epoxide function of a glycidyl ether of the formula IV, in which y is a number from 2 to 5.

3. An addition product as claimed in claim 1 wherein the addition product (2) is propoxylated with 5 to 700 g of propylene oxide per 100 g.

4. An addition product as claimed in claim 1, wherein the equivalent ratio of reaction components (1), (2) and (3) is 1:0.3 to 1:0.7 to 1.5.

5. A process for demulsifying crude oil emulsions, which comprises adding thereto an effective amount of an esterified glycidyl ether addition product as claimed in claim 1 to the emulsions.

* * * * *